Figure 2:
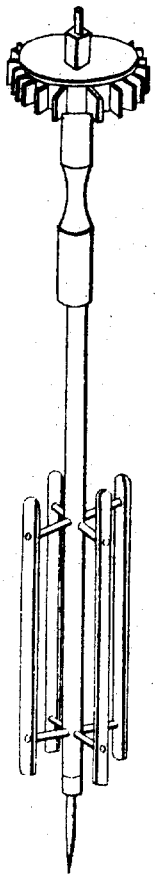
Figure 1:
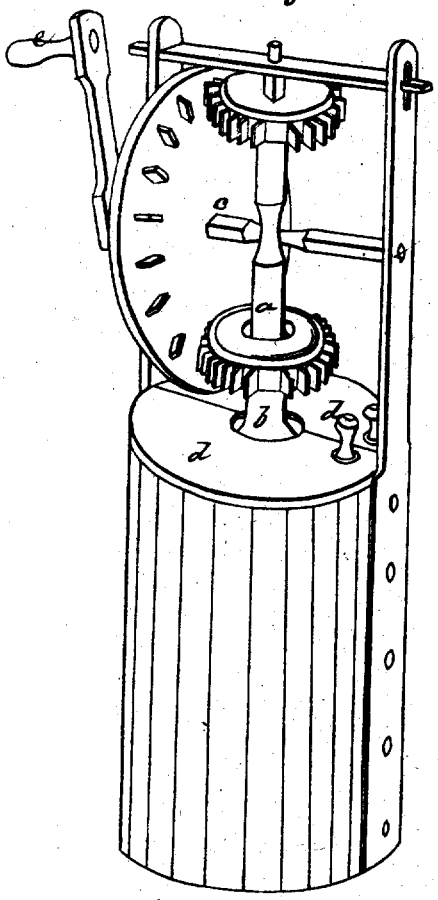
Figure 3:
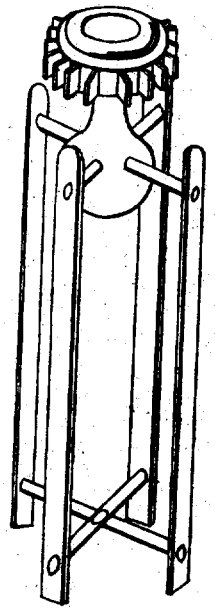

812X

J. Scripture,

Churn.

Patented Dec. 15. 1807.

812-X

812X . Dec. 15, 180[illegible]

John Scripture
Letters Patent.

The Schedule referred to in these Letters Patent and making part of the same containing a description in the words of the said John Scripture himself of his churning machine The Body of the Churn is to be round like a common churn.
in the inside to give motion to the cream or milk. are to be two dashers in
the form of a reel which are to turn round on a spindle passing through
the centre of the churn from top to bottom. the large dasher is to be fixed
with four slats from the ends of the arms at top and bottom and are
to stand perpendicular in range with the staves of the churn.
and are to pass (when turned round) near the inside of the staves of the Churn.
The small dasher is made like the other only smaller so as to turn round with
in the large one. The small dasher is fixed to the spindle upon which are fixed
two trundle heads above the body of the Churn. The upper trundle head is fasten
to the Spindle. The lower trundle head is fixed to a Box made over the said
spindle and extends down and connects with the arms or top part of the large
dasher. these two trundle heads are put in motion by turning a crank on the
shaft or spindle of which is a cog wheel which at top and bottom intersects
said trundle heads the topmost of which being connected with the spindle to
which is connected the small dasher, that dasher is turned one way and the
lower trundle head being connected with the said Box and that Box with the upper
end or arms of the large Dasher that dasher is turned an opposite way, so
that the Dashers when in motion turn different ways by which means the cream
or milk is immediately churned into Butter. The upper trundle head is so
fixed that it can easily slide up from the cog wheel so that the small dash-
er is immediately stopped. and the large dasher may go round and collect
the Butter ready to be taken out of the churn. On the outside of the churn
two posts may be fixed, through one of which the spindle may run to which
the crank is fixed. and across the tops of these posts a slat must go into which
the top of the said perpendicular spindle is to be fixed. This machine may be
set in motion by hand by water or by a machine going by weight

8012X

170

Exd.

1496 only my other pencil [redacted]

Witness [redacted] Jas. Christie

Timothy Pickett

[ otherwise name ]

Drawing made —

1448

(Patented 15 Dec. 1897)